UNITED STATES PATENT OFFICE.

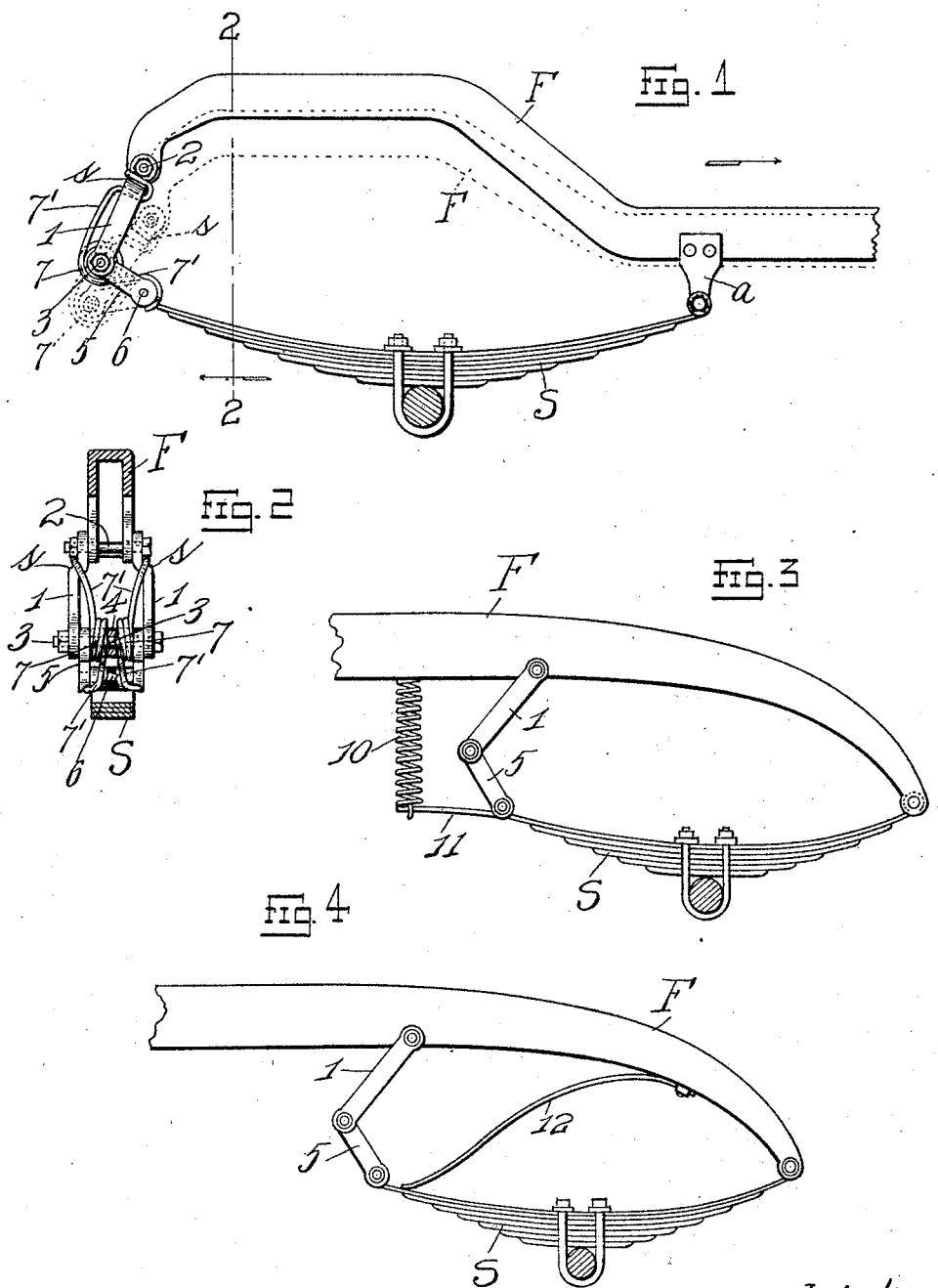

FELIX R. CHAUDET, OF ST. LOUIS, MISSOURI.

VEHICLE-SPRING.

1,393,088.   Specification of Letters Patent.   Patented Oct. 11, 1921.

Application filed October 23, 1920. Serial No. 419,022.

*To all whom it may concern:*

Be it known that I, FELIX R. CHAUDET, a citizen of the United States, residing at St. Louis, State of Missouri, have invented certain new and useful Improvements in Vehicle-Springs, of which the following is a full, clear, and exact description, reference being had to the accompanying drawings, forming a part hereof.

The present invention is directed to improvements in auxiliary supporting springs for vehicles, particularly motor trucks and automobiles, the object sought being to provide a spring supplemental to the main supporting spring, weaker than said main spring, and tensioned to absorb the shocks and take up the stresses resulting from loads of less weight than that for which the main spring is designed, the resilience of the latter spring not being brought into requisition until after the weight of the load deposited on the vehicle overcomes the tension of the weaker spring. A further object of the invention is to so combine the main and auxiliary springs as to impart a maximum degree of resilience to the joint structure, the end of the main spring which is coupled to the auxiliary spring being more or less floating by reason of the yielding link connection between the main spring and the frame of the vehicle. One of the main advantages of the improvement is that a motor truck the main springs of which are designed to support say a load of three tons before flexing, may carry a load, including the driver, weighing for example one ton with no discomfort to the driver, the jars and shocks incident to the lesser load being all absorbed by the resilience of the weaker auxiliary spring, said resilience asserting itself under all loads that are insufficient to overcome the tension of said spring. A further object is to provide an auxiliary spring that is simple, one to attach which requires no alteration in the structures of existing main springs, one susceptible of modification without involving a departure from the basic principle of the invention, and one possessing further and other advantages better apparent from the following detailed description in connection with the accompanying drawings in which—

Figure 1 represents a side elevation of the rear end of an automobile frame showing one form of my invention applied thereto; Fig. 2 is a vertical transverse section through the side member of the frame and main spring on the line 2—2 of Fig. 1; Fig. 3 is a side elevation of one end of an automobile frame showing a modification of the invention; and Fig. 4 is a similar view showing a further modification.

Referring to the drawings, and for the present to Figs. 1 and 2, F represents a portion (the rear end) of the side member of a conventional frame of an automobile or motor truck, S, the main bowed leaf spring, and *a* the bracket to which the inner end of the leaf spring is pivotally attached. In the present embodiment of my invention the opposite end of the leaf spring is coupled to the frame member by a toggle joint comprising a pair of toggle links 1, 1, hinged at their upper ends to the sides of the frame member F, a hinge pin 2 passing through the member and terminals of the links, the latter being formed with offsets or shoulders *s* adjacent their common hinge axis. The opposite ends of the links 1, 1, are connected by a hinge pin 3 about which is loosely passed the cross member or sleeve 4 of the complementary forked or U-shaped toggle link, the outer ends of the arms 5, 5, of said link being pivotally coupled to a pin 6 about which the adjacent end of the main spring S is wrapped. The toggle joint aforesaid not only permits the adjacent end of the main spring to float freely, but permits the easy mounting of the auxiliary spring above referred to. In the preferred form of the invention the auxiliary spring is composed of two sections, each section comprising a central coil 7 wrapped loosely about the sleeve 4, and arms or extensions 7', 7', leading from said coil in opposite directions, the free ends of the extensions being respectively secured to or wrapped about the offsets *s* of the links 1, 1, and passed over the pin 6 and then brought around the sides of the spring S as shown in Figs. 1 and 2. The auxiliary spring is so tensioned as to cause the arms 7', 7', to expand when free, the same closing or approaching one another (and hence winding up the coils 7) with the imposition of a sufficient load on the frame, or in the event of a jolt should the vehicle pass over an obstruction in the road.

Assuming that the vehicle is traveling in the direction indicated by the arrow in Fig. 1, and that the wheel of the vehicle encounters an obstruction in the road, it is obvious that for the instant the wheel will come to a stop, inertia tending to carry the frame forward. This action tends to depress the end of the frame coupled to the auxiliary spring, the latter absorbing the jars incident to this jolt, so that the occupants of the car do not suffer any inconvenience. If the vehicle carries a light load the jars are in the main absorbed by the auxiliary spring. When the load is a heavy one, the main spring S of course is brought into requisition, the tension of the auxiliary and weaker spring being by that time wholly overcome. Obviously, with a tightening of the auxiliary spring, the arms 7′, 7′, thereof are brought closer and closer together, such approach of the arms taking place with a closing movement of the toggle joint (dotted position Fig. 1) upon a depression of the vehicle frame for any reason. When the toggle joint is completely closed under the action of an excessive load, it is obvious that the resilience of the auxiliary spring can no longer be availed of. It is then that the resilience of the main spring begins to assert itself, the same as it does in vehicles not provided with auxiliary springs.

The invention is obviously susceptible of considerable modification. Thus, in Fig. 3 is shown a coiled auxiliary spring 10 interposed between the frame member F and an extension 11 leading from the main spring S. In Fig. 4 use is made of a flexed spring 12 one end of which is secured to the frame, the free end bearing against the main spring S at a point near the toggle joint connecting said spring to the frame. The toggle joint is the same in all the forms, the same references being applied thereto in the several figures.

Having described my invention what I claim is:

In combination with a vehicle frame, a main bowed spring connected at one end to the frame, a toggle joint comprising a pair of toggle links hinged at one end on opposite sides of the frame member, a hinge pin connecting the opposite ends of the links, a forked toggle link comprising a sleeve or tubular cross member hinged to said pin and fork arms leading from the ends of the sleeve between the toggle links aforesaid, a hinge pin coupling the outer ends of the fork arms to the adjacent end of the main spring, and an auxiliary spring comprising two sections each having an intermediate coil wrapped about the sleeve mounted on the hinge pin of the toggle, and extensions leading from said coil in opposite directions and with ends respectively secured at the points of connection of the first mentioned toggle links with the frame, and at the points of connection of the main spring with the arms of the forked toggle link aforesaid, said auxiliary spring responding to the closing and opening movements of the toggle joint.

In testimony where I affix my signature, in presence of two witnesses.

FELIX R. CHAUDET.

Witnesses:
EMIL STAREK,
JOS. A. MICHEL.